United States Patent [19]
Johnson

[11] 3,745,832
[45] July 17, 1973

[54] LINK-TYPE HYPERSONIC CENTRIFUGE

[75] Inventor: Allen M. L. Johnson, Succasunna, N.J.

[73] Assignee: The United States of America as represented by the Secretary of the Army, Washington, D.C.

[22] Filed: May 13, 1971

[21] Appl. No.: 143,073

[52] U.S. Cl. ............................. 73/432 R, 73/1 DC
[51] Int. Cl. ..................... G01n 19/00, G01p 21/00
[58] Field of Search .......... 73/1 DC, 432 R, 432 SD

[56] References Cited
UNITED STATES PATENTS
3,136,075 6/1964 Brian ................................. 73/1 DC
3,142,169 7/1964 Bates .................................. 73/1 DC
2,924,092 2/1960 Bournes ............................. 73/1 DC FOREIGN PATENTS OR APPLICATIONS
170,184 1965 U.S.S.R. ............................ 73/1 DC Primary Examiner—S. Clement Swisher
Attorney—Harry M. Saragovitz, Edward J. Kelly, Herbert Berl and Ernest F. Weinberger

[57] ABSTRACT

A centrifuge is disclosed for subjecting items under test forces similar to those encountered in ballistic flight. The centrifuge includes a controlled crank arm which alters the radial position of the sample under test while the centrifuge is rotating to therefore increase or decrease the forces thereon. Details of the crank arm mechanism and counterweight and balance systems are also disclosed.

4 Claims, 15 Drawing Figures

INVENTOR.
ALLEN M.L. JOHNSON

PATENTED JUL 17 1973 3,745,832

INVENTOR.
ALLEN M.L. JOHNSON

ATTORNEYS

INVENTOR.
ALLEN M.L. JOHNSON

INVENTOR.
ALLEN M.L. JOHNSON

LINK-TYPE HYPERSONIC CENTRIFUGE

FIELD OF THE INVENTION

This invention relates to centrifuges and particularly to a centrifuge for testing components to be used in ballistic missiles.

BACKGROUND OF THE INVENTION

Component parts of ballistic missiles, such as electronic and mechanical elements, undergo severe environmental conditions during ballistic flight. Some of these environmental conditions are not normally encountered by such components in other functioning equipment. For example, a component in a ballistic missile may upon launch undergo a force exerted thereon, upwards of 100 times the force of gravity during the first 100 milliseconds of flight. A second force may then be experienced of the same magnitude some 500 milliseconds later. These forces, of course, would be caused by the proper operation of the first and second stages of a multistage rocket.

In order to insure reliability of such ballistic missiles, it is necessary to subject components which are to be used therein to environmental conditions which simulate actual flight conditions. If this were not done, systems and circuits which proved out in ground operation might fail during actual flight.

Currently, components to be employed in ballistic missiles are tested on a common centrifuge. In such a centrifuge a test piece is fixtured thereon at a fixed radial distance from the center of rotation. A speed of rotation is then selected to produce the maximum desired $g$ force. While the centrifuge is going from rest to the selected speed of rotation, the test piece is being subjected to varying accelerations and therefore varying $g$ forces. The interval during which these varying $g$ forces are experienced, typically lasts in excess of 60 seconds based upon the mass of the centrifuge. It will be noted that this is some hundred times slower than the rate of build up of $g$ forces which is experienced in the field.

One approach which has been taken to surmount this deficiency is to mount the test piece normal to the force axis of the centrifuge. This can only be done, of course, if the force is to be applied on the test piece in only one direction. After the centrifuge reaches its constant rotational speed, the test piece is rotated to allign itself with the force axis. This arrangement introduces spurious shock waves and imposes the full $g$ force effect as an unnatural and unwanted force sideways to the test piece.

An additional problem which is experienced with commonly available centrifuges is the inability to produce the second cycle of operation (i.e. a first maximum force separated from a second maximum force by a time interval of hundreds of milliseconds).

Therefore, it is an object of this invention to provide a device which can be employed to nondestructively test components employed in ballistic missiles for their ability to withstand $g$ forces.

It is a further object of this invention to provide a centrifuge which can produce more than one full cycle of acceleration and deceleration.

It is a further object of this invention to provide a centrifuge which can achieve greater rates of change of acceleration than is experienced in hypersonic missiles.

It is still a further object of this invention to provide a new and improved centrifuge which can produce the above-mentioned forces without generating unwanted side forces.

BRIEF DESCRIPTION OF THE INVENTION

With these and other objects in view the present invention contemplates a system in which a centrifuge which spins about a center of rotation is adapted to hold a workpiece to be tested at a first radial distance from the center of rotation until a predetermined speed is attained. The workpiece is then moved to a second radial distance from the center of rotation which is greater than the first to increase the forces applied thereto. In this way it is possible to apply force impulses to a workpiece having rates of buildup greater than would be possible by merely reducing the inertia of the centrifuge.

In one mode of operation the centrifuge is adapted to move the workpiece to a predetermined radial distance, withdraw the workpiece back towards the center of rotation and extend the workpiece again to a larger radial distance for a second time. This is done to simulate the first two stages of thrust in a multistage ballistic missile.

The centrifuge is further configured to pivot the workpiece about its own axis as it is moved from one radial distance to another to compensate for Coriolis forces which change the direction in which the net force is applied to the workpiece.

DESCRIPTION OF THE DRAWINGS

A more complete understanding of the invention can be had by reference to the following detailed specifications and drawings in which.

DETAILED DESCRIPTION OF THE INVENTION

Figure 1:
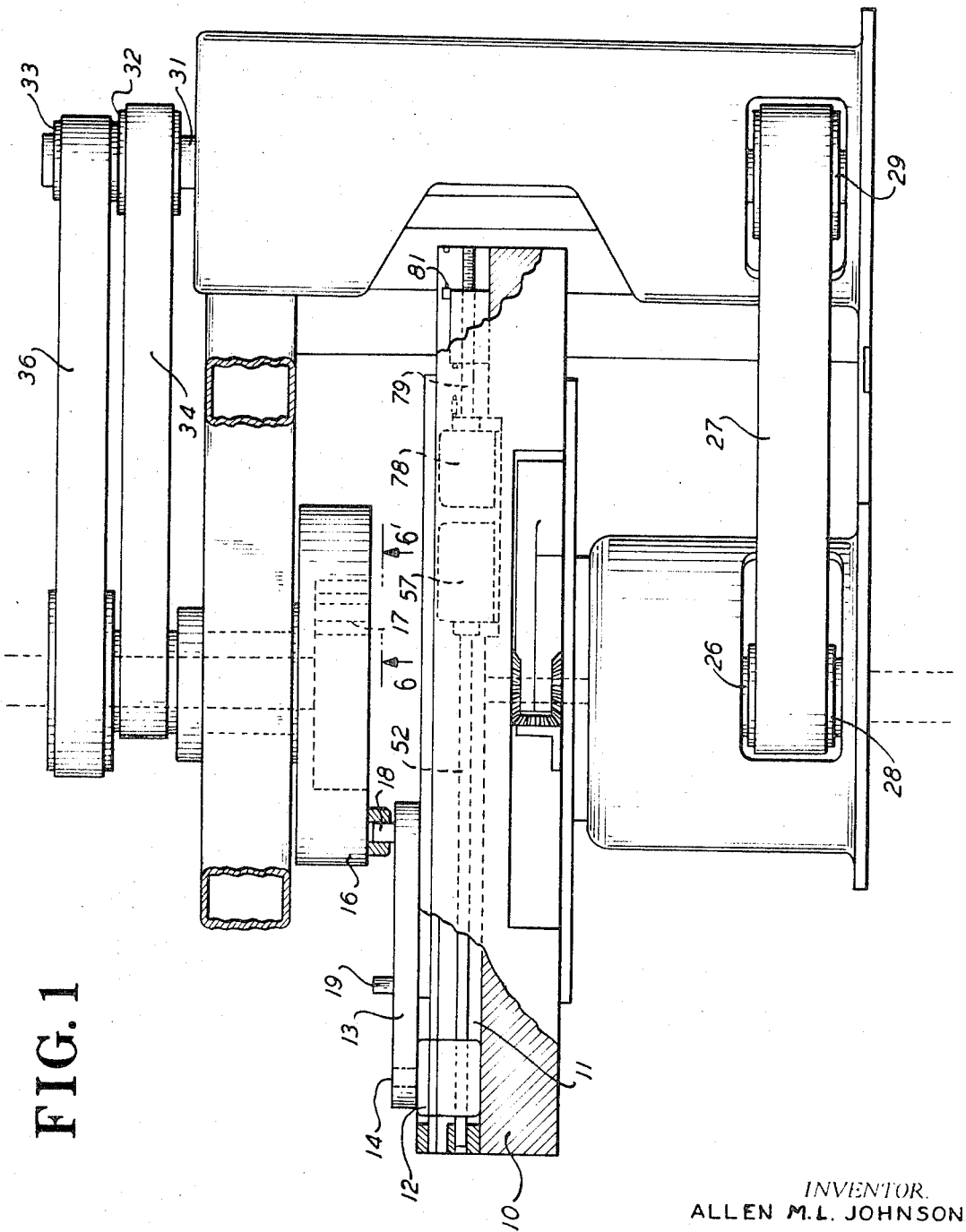
FIG. 1 is a side view of a centrifuge embodying the principles of this invention.
Figure 2:
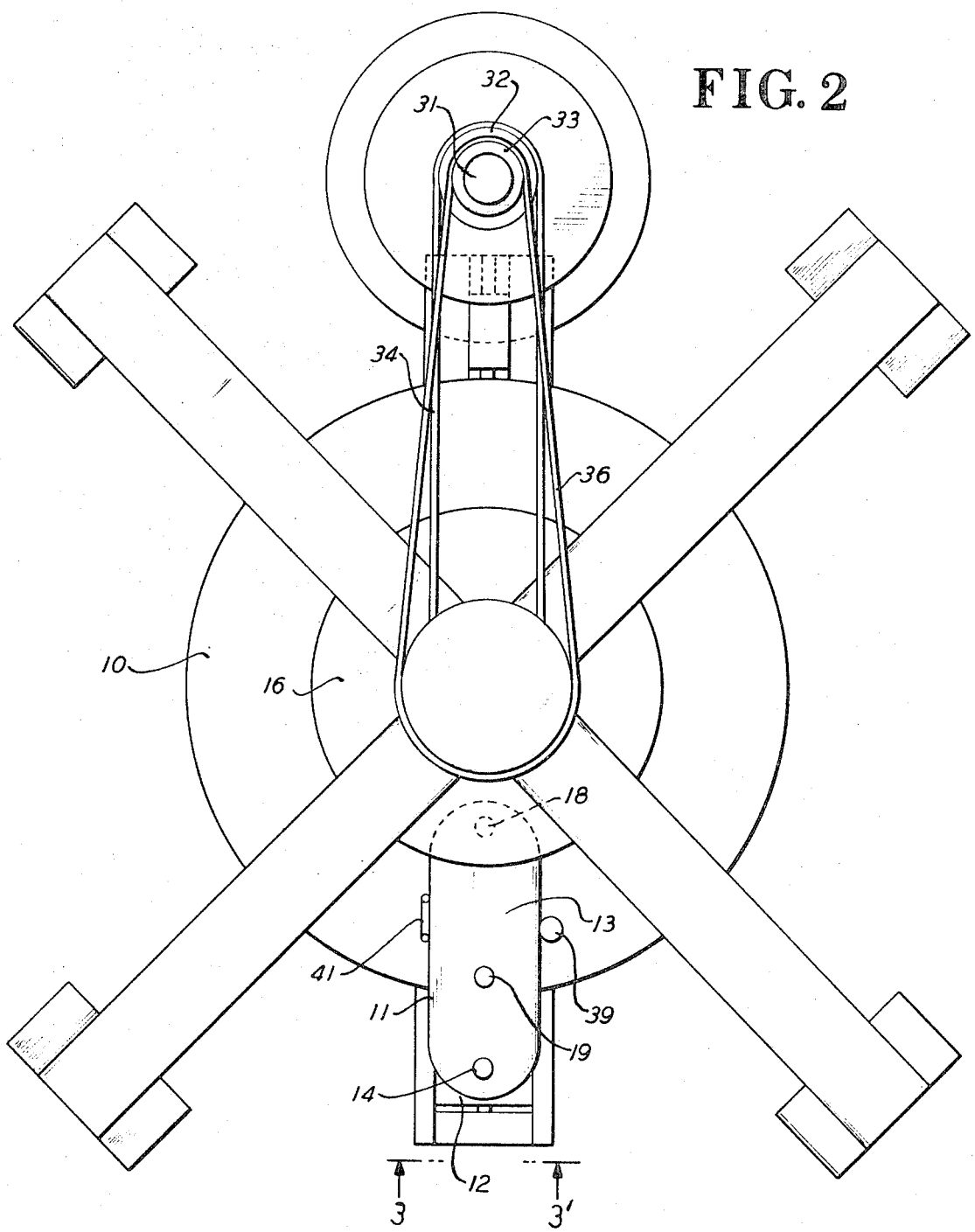
FIG. 2 is a top view of the centrifuge shown in FIG. 1.
Figure 3:
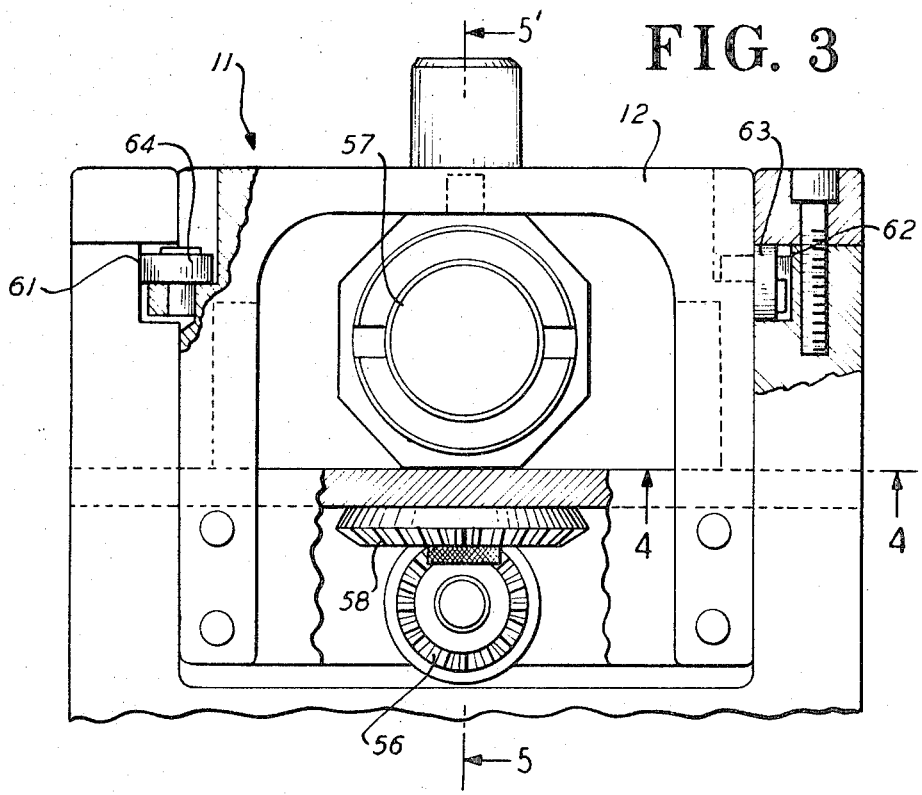
FIG. 3 is a sectional view taken along the line 3—3 of FIG. 2 showing details of a workpiece holding fixture employed in a centrifuge embodying the principles of this invention.
Figure 5:
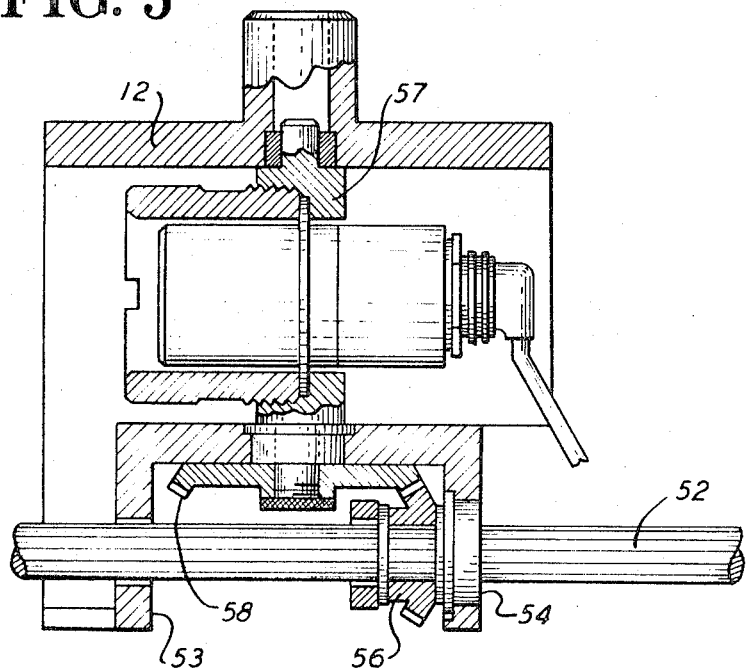
FIG. 5 is a sectional view taken along the line 5—5 of FIG. 3 showing more details of the fixture and the structure for applying rotational power thereto.
Figure 4:
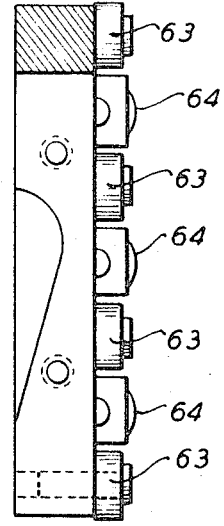
FIG. 4 is a sectional view taken along the line 4—4 of FIG. 3 showing the bidirectional rollers which carry the fixture of FIG. 3 along a guide track.

Referring now to FIGS. 1 and 2 we see a hypersonic centrifuge constructed in accordance with the teachings of this invention. The centrifuge includes a turntable 10 having a track 11 therein which carries a test fixture 12. The test fixture 12 rides up and down the track 11 under the control of a crank arm 13 which forms part of a crank arm assembly. One portion 14 of the crank arm assembly 13 is connectable to the fixture 12. A pair of concentric overhead rotating anchors 16 and 17 are adapted to selectively engage pivot members 18 and 19 respectively which extend upwardly from the crank arm 13.

The turntable 10 is mounted for rotation about a center of rotation defined by a shaft 26. Power is provided to the shaft 26 by a belt and pulley combination including belt 27 and pulleys 28 and 29, or by a power source (not shown) in direct engagement with shaft 26.

The pulley 29 is connected to a shaft 31 which drives an additional pair of pulleys 32 and 33. The pulley 32 drives a belt 34 for rotating the outer anchor 16 while the pulley 33 drives a belt 36 which drives the inner anchor 17.

It should be clear that in the drive arrangement thus described, the source of drive power, not shown, could be connected to either the shaft 26 or the shaft 31.

Referring now to FIG. 10 we see in dotted line the forces applied by the hypersonic missile to a component contained therein. In solid curvilinear lines we see forces applied to a workpiece, under test, by the centrifuge of this invention. The plot in FIG. 10a shows that an initial impulse of force is applied to a component by the first rocket boost. Thereafter an interval of zero $g$ forces exists and then a second longer force is applied to a component which senses proper operation of a missile. If the first stage of the rocket does not function for a significantly long time interval, the sensing component should indicate deviation from this force pattern, as represented in FIG. 10b. FIG. 10c shows a force pattern which one may wish to apply to a component which actually simulates the forces applied by the rocket. FIG. 10d shows a force pattern which would be applied if the second stage did not function properly.

Figure 11B:
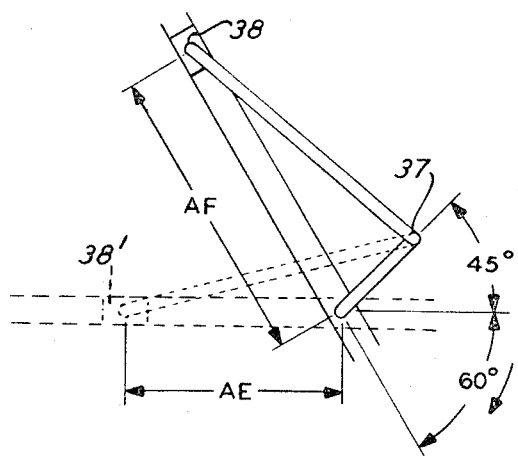
FIGS. 11a and 11b show crank arm mechanisms in various states of operation for purposes of understanding certain functions of the centrifuge of this invention.
Figure 11A:
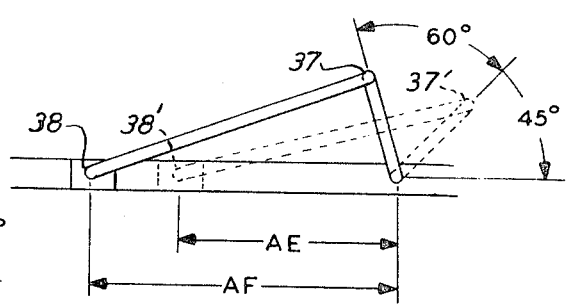
Figure 10A:
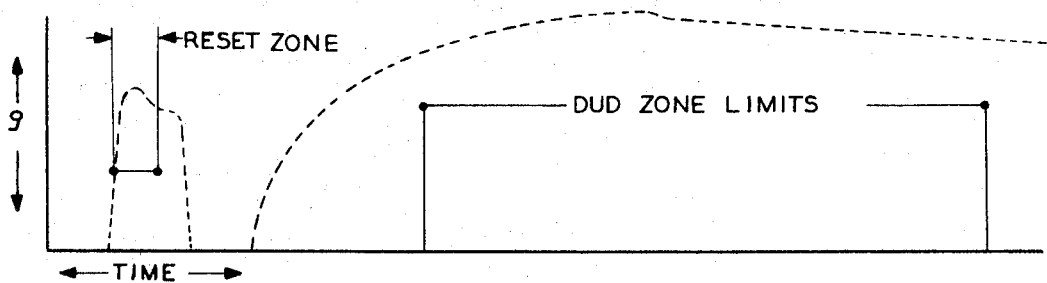
FIGS. 10a, 10b, 10c and 10d are plots of force versus time for various desired and achieved conditions.
Figure 10B:
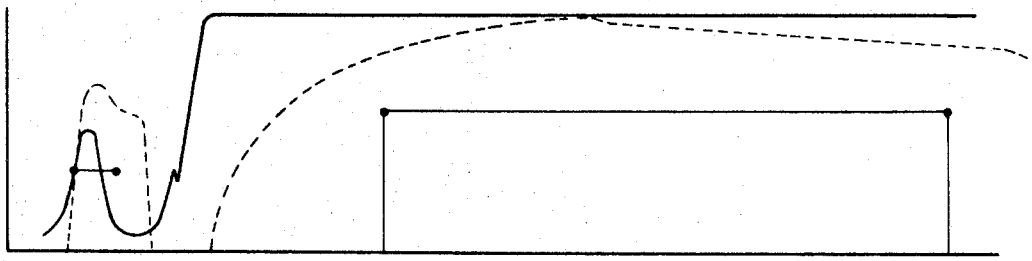
Figure 10C:
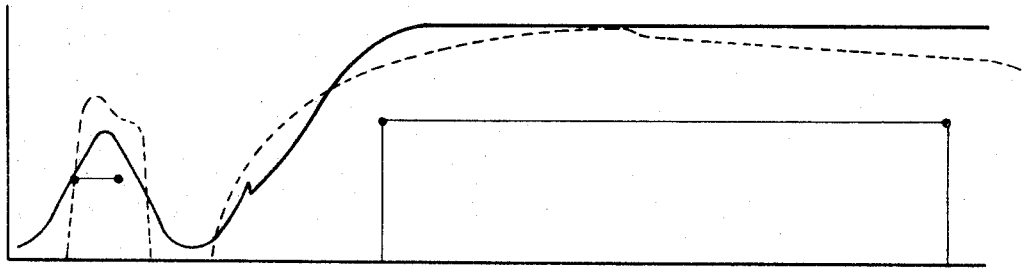
Figure 10D:
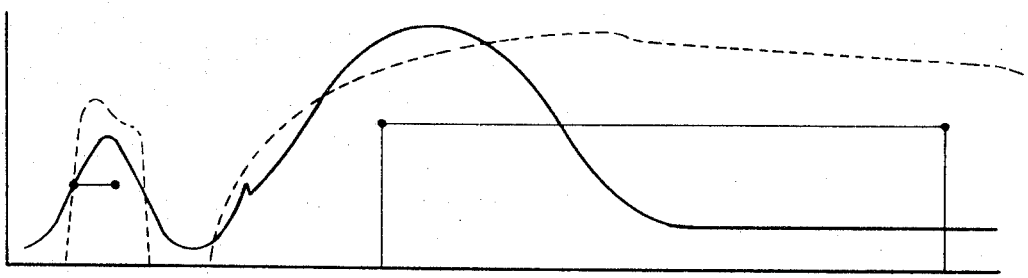

In FIG. 11a we see a schematic view of a crank arm shown in two positions, one in solid and one in dotted line. The two positions show how the movement of a pivot point 37 60 degrees to a pivot point 37' affects the movement of a slider member 38 to move it to a position shown by the phantom member 38'. FIG. 11b shows in a similar manner that by holding the pivot point 37 in a fixed position and rotating the slider track 60 degrees, the member 38 will move a similar distance. It, of course, should be further appreciated that by rotating the track and moving the pivot point 37 in a rotational manner at a different speed, various motion times of the member 38 can be produced. In accordance with this concept (see again FIG. 1) the test fixture 12 is moved along the track 11 by a crank arm mechanism which includes the crank arm assembly 13 and the anchors 17 and 18.

In one mode of operation the sharp buildup of forces is achieved on the test fixture 12 by holding the fixture 12 at a small radial distance from the center of rotation. This is accomplished by means of an initial positioning pin, not shown in FIG. 1, fixed in and projecting from the turntable 10, engaging a transverse slot, also not shown, in the underside of the crank arm assembly 13. After the time interval has elapsed for the inertia of the turntable 10 to be overcome, the anchor 17 engages the pivot member 19 on the crank arm assembly 13 to advance the fixture 12 outwardly along the track 11 as the turntable rotates. Release of carnk arm assembly 13 from the aforementioned initial positioning pin occurs when anchor 17 engages pivot member 19. The anchor 17 acts as a pivot point. With the anchor 17 in a fixed angular position, the fixture 12 reaches its maximum radial distance from the center (i.e. the length of the anchor 17 and the distance between the pivot member 19 and the fixture 12) in one revolution of the turntable 10 thereby building up to maximum force in one revolution. It should be appreciated that due to the inertia of the turntable 10, this force buildup would not be practical by merely starting the turntable moving from a dead stop.

If a slower buildup, for example, were desired the anchor 17 would be rotated at a rate sufficient to give the desired force buildup. It should be appreciated that the factors of rate of rotation of the turntable 10 and the angular distances which the fixture 12 can be moved make up the absolute force value which may be applied to the test fixture 12. Therefore, it may at times be desirable to not alter these factors and use the rotation of the anchor 17 to take into account the variable of time buildup of forces.

To accomplish a second force magnitude the anchor 16 and the pivot member 18 would be employed. If it is desirable to have an impulse force, the anchor and pivot member employed would remain engaged so that the force would buildup as the fixture 12 is extended and be reduced as the fixture 12 is naturally withdrawn due to the crank arm motion. If on the other hand it is desirable, as seen in the second portion of the curves in FIG. 10b or 10c, to sustain a force on the fixture 12, the crank arm assembly 13 and the anchor 16 connected thereto would be disengaged. In FIG. 2 we see a stop member 39 and a spring loaded holding member 41 which holds the crank arm assembly 13 in a stationary position when the fixture 12 is extended and the crank arm assembly 13 is disengaged from driving members.

Figure 7:
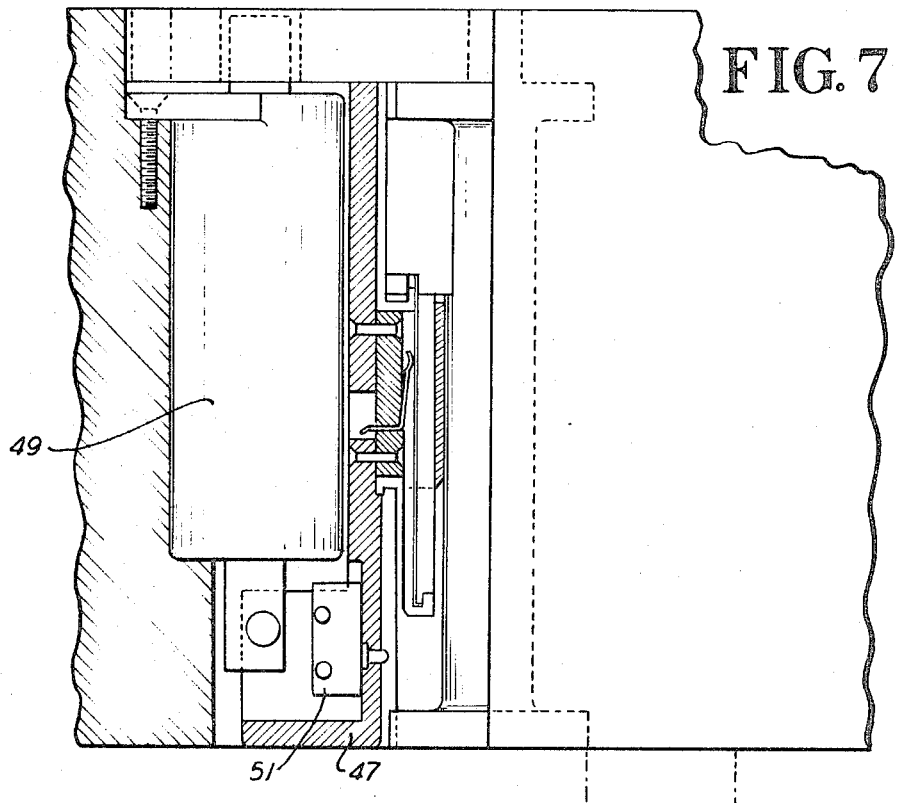
FIG. 7 is a sectional view taken along the line 7—7 of FIG. 6 showing additional details of the anchor.
Figure 6:
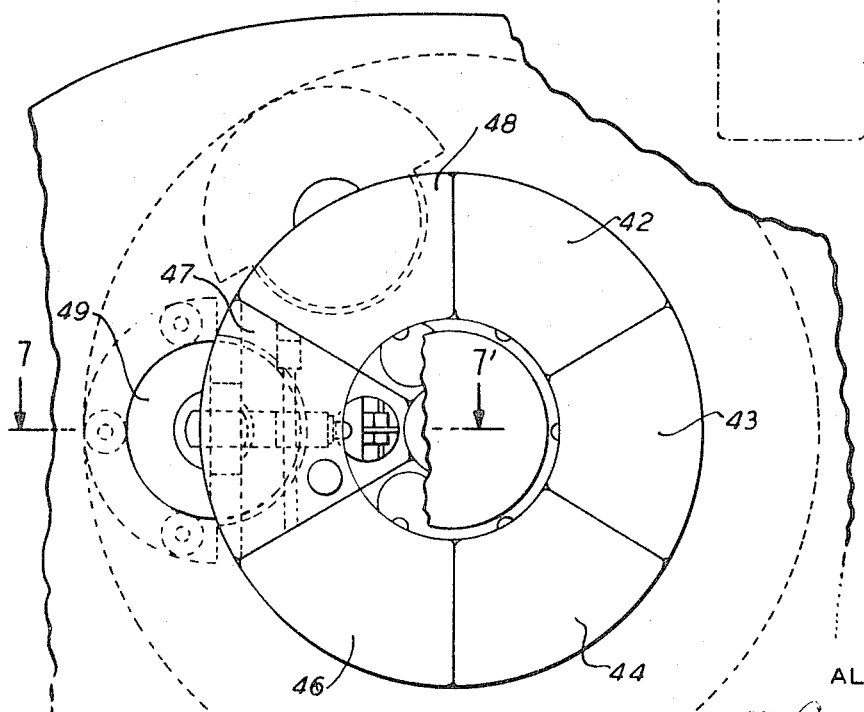
FIG. 6 is a sectional view taken along the line 6—6 of FIG. 1 showing details of an anchor mechanism for engaging and disengaging the fixture from a moving mechanism.

Referring now to FIGS. 6 and 7 we see the details of the anchor mechanisms 16 and 17. Each of the anchor mechanisms 16 and 17 includes an anchor portion made up of six segments 42 through 44 and 46 through 48. Looking particularly at FIG. 7 we see that a solenoid 49 actuated by a switch 51 extends the segment 47 as does a similar solenoid operated by a similar switch extend each of the other segments 42 through 44 and 46 and 48. In operation (see FIGS. 1 and 6) three of the segments for example segments 46, 47 and 48 are extended by command while the three segments 42 through 44 are withdrawn as the anchor 17 moves with respect to the turntable 10. When the pivot 19 engages the switches on the segments 46 through 48, the segments 42 through 44 are extended downwardly to capture the pivot 19. In a like manner the segments 46 through 48 would be withdrawn to release the pivot member 19.

Looking now to FIGS. 1 and 3 through 5, we see that the fixture 12 rides in the track 11 along a splined shaft 52. A pair of openings 53 and 54 are arranged in the bottom portion of the fixture 12 for the fixture 12 to move freely along under control of the crank arm assembly 13. A splined bevelled gear 56 is carried along the splined shaft 52 with the fixture 12 to rotate a work holding chamber 57 in the fixture 12 by engaging a bevelled gear 58 attached to the chamber 57.

During the time that the radial distance of the fixture 12 is varying, Coriolis forces are generated on the fixture 12 which, when taken together with the centrifugal forces, produces a resultant force which is no longer along a radius of the worktable 10. Therefore, a motor 59 is provided to rotate the splined shaft, under program control, to alter the pivotal relationship of the chamber 57 with respect to the track 11 by pivoting the bevelled gears 56 and 58. In this way the direction of force on a workpiece mounted in the chamber 57 may remain constant during the entire test.

The track 11 has a pair of channels 61 and 62 in which the fixture 12 rides. The fixture 12 (see FIG. 4 in particular) has on each side thereof perpendicularly disposed rollers 63 and 64. The rollers 63 carry the fixture 12 in a horizontal direction while the rollers 64 control the fixture in a horizontal direction.

Figure 8:
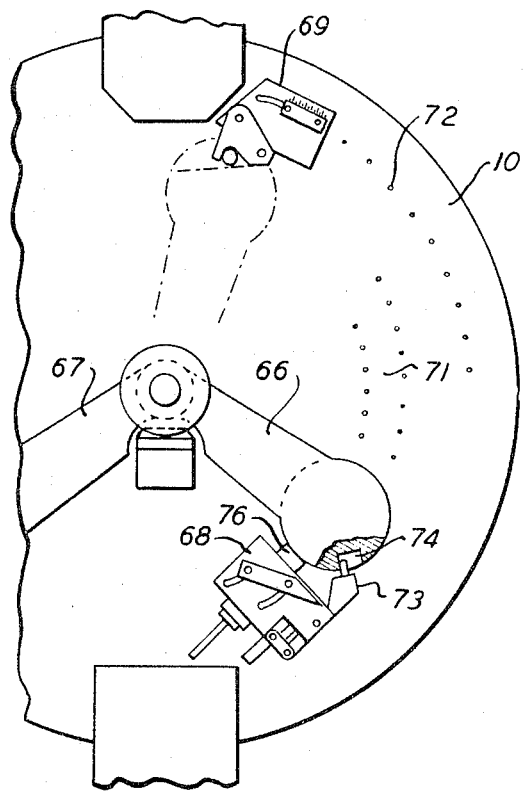
FIG. 8 is a top view of a lower turntable shown in FIG. 1 showing counterweight mechanisms employed in the preferred embodiment of this invention.

As the fixture 12 and the crank arm assembly 13 move about the turntable 10 in a radial direction the balance thereof is upset. Therefore, (see FIGS. 8 and 9) a pair of balance arms 66 and 67 are provided which may be thrust from one position under the turntable 10 to another by a solenoid holder 68 to a rest position defined by a bracket 69. The degree of balancing necessary can be accomodated by adjustment of the position of the solenoid 68 or the bracket 69. A pair of lines of securing holes 71 are provided for the positioning of the solenoid 68 while a single line of securing holes 72 are provided for the positioning of the bracket 69.

Figure 9:
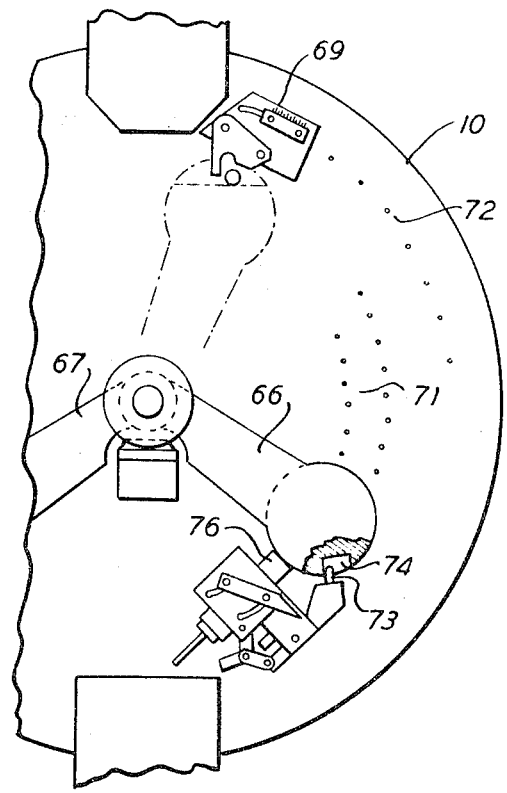
FIG. 9 is a top view of the same turntable as shown in FIG. 8 in a second state of operation.

The solenoid 68 has two active portions thereof. The first 73 holds the member 66 in a cleft portion 74, while a thrusting member 76 is held in a recoiled position. In FIG. 9 we see the holding member 73 withdrawn from the cleft portion 74 and the thrusting member 76 extended to push the member 76 over to the bracket 69.

If the balancing members 66 and 67 are not sufficient to offset the imbalances caused by motion of the fixture 12 and the crank arm assembly 13, a motor 78 may be provided to drive a threaded shaft 79 for purposes of moving a balancing weight 81. Of course the motor 78 would be driven from a programmed sensor which would not actuate the motor 78 until a threshold imbalance were detected for a predetermined interval of time.

It should be understood that while this invention has been described with respect to a particular embodiment thereof, numerous others will become obvious to those of ordinary skill in the art in light thereof.

What is claimed is:

1. A centrifuge including:
   a fixture for holding a workpiece to be subjected to forces by said centrifuge;
   means for mounting said fixture at a radial distance from a center of rotation to rotate said fixture about said center of rotation which includes;
   an arm member mounted for rotation about said center of rotation; said arm member having a track along which said fixture rides; said track extending radially out from said center of rotation;
   a crank arm having one portion thereof selectively pivotally connectable to said fixture for moving said fixture along said track as said arm member rotates;
   a holding member selectively pivotally connectable to a second portion of said crank arm;
   means for mounting said holding member for rotation about said center of rotation;
   means for driving said mounting means to rotate said fixture about said center of rotation; and
   means for altering said radial distance while said fixture rotates about said center of rotation to alter the forces to which said workpiece is subjected.

2. The centrifuge as defined in claim 1 in which said arm member rotates at a first rate and said holding member rotates at a second rate, said first rate being greater than said second rate.

3. A centrifuge including:
   a fixture for holding a workpiece to be subjected to forces by said centrifuge;
   means for mounting said fixture at a radial distance from a center of rotation to rotate said fixture about said center of rotation which includes;
   an arm member mounted for rotation about said center of rotation; said arm member having a track along which said fixture rides; said track radially extends out from said center of rotation;
   a crank arm having one portion thereof selectively pivotally connectable to said fixture for moving said fixture along said track as said member rotates;
   a holding member selectively pivotally connectable to a second portion of said crank arm; means for selectively pivotally connecting said holding member to a third portion of said crank arm; and
   means for mounting said holding member for rotation about said center of rotation;
   means for driving said mounting means to rotate said fixture about said center of rotation; said centrifuge characterized by; and
   means for altering said radial distance while said fixture rotates about said center of rotation to alter the forces to which said workpiece is subjected.

4. The centrifuge as defined in claim 3 in which said arm member rotates at a first rate and said holding member rotates at a second rate, said first rate being greater than said second rate.

* * * * *